April 11, 1950  G. H. ALLGEYER  2,503,862
SWITCH
Filed April 26, 1948
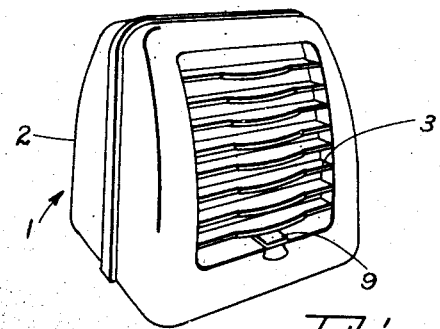
Fig. I
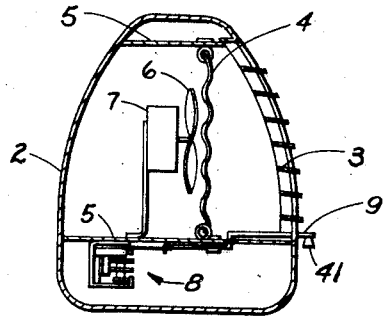
Fig. II
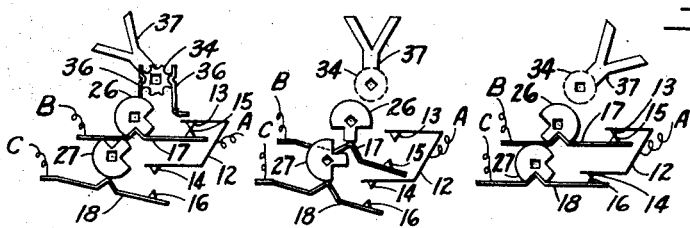
Fig. IV   Fig. V   Fig. VI
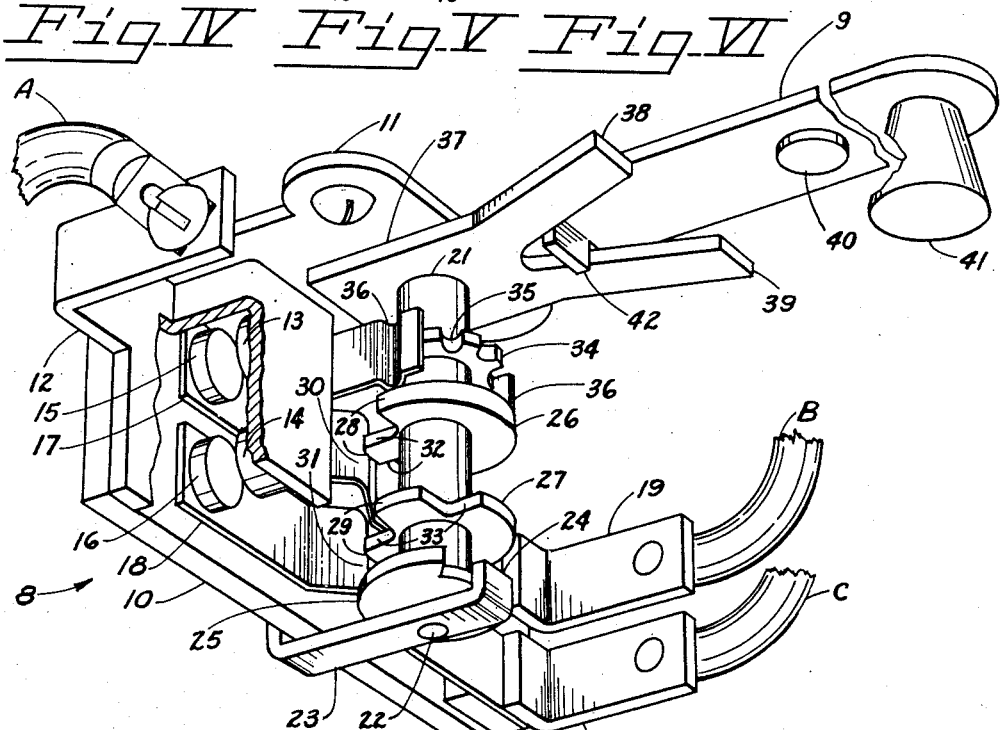
Fig. III
INVENTOR.
Guy H. Allgeyer
BY
Marshall and Marshall
ATTORNEYS Patented Apr. 11, 1950

2,503,862

UNITED STATES PATENT OFFICE 2,503,862

SWITCH

Guy H. Allgeyer, Toledo, Ohio, assignor to The Swartzbaugh Manufacturing Company, Toledo, Ohio, a corporation of Ohio Application April 26, 1948, Serial No. 23,149

2 Claims. (Cl. 219—39)

This invention relates to combination electric space heaters and fans and more particularly to an electric switch for use in such a device.

An electric space heater and fan of the type described herein has a heating element and a fan for blowing air across the heating element. The heating element and the fan are not included in the same electric circuit, since it is often desired to operate only the fan or, in other cases, to operate the device as a space heater with the heating element and the fan motor both energized.

Safety and simplicity of operation are essential elements of the sales value of such devices, which are sold for use in the household. A number of separate controls or switches on such a device tends only to confuse the user and to detract from the sales value. On the other hand, it is not economically practical to have a complicated, and perhaps unsafe, switch for the purpose of actuating several circuits in the operation of such a device.

It is an object of this invention to provide an electric switch for selectively actuating one or more electric circuits simultaneously.

It is a further object of this invention to provide an electric switch for selectively actuating one or more electric circuits by a single, simple movement of the switch.

It is still another object of this invention to provide a safe and inexpensive electric switch for selectively actuating one or more electric circuits in an electric space heater and fan.

These and more specific objects and advantages will be apparent from the drawings, in which:

Figure I is a view in perspective of a combination electric space heater and fan.

Figure II is a vertical cross sectional view of the device shown in Figure I and showing the location of an electric switch embodying the invention.

Figure III is a view in perspective of an electric switch embodying the invention.

Figure IV is a schematic diagram of a switch embodying the invention set so that one circuit is open and one circuit is closed.

Figure V is a diagram similar to Figure IV but with the switch set so that both circuits are open, as shown in Figure III.

Figure VI is a diagram similar to Figure IV but with the switch set so that both circuits are closed.

Referring to the drawings in detail, an electric space heater 1 has a housing 2 and a grill 3 in the front of the heater 1 which affords an ornamental covering and protection for a heating element 4 mounted on a frame 5 within the housing 2 and insulated therefrom. Behind the heating element 4 is a fan 6 and an electric motor 7 therefor mounted on the frame 5. A switch 8 embodying the invention is mounted on the bottom side of the frame 5, the switch handle 9 extending forwardly and outside of the housing 2 through the bottom of the grill 3.

Referring to the schematic diagrams, an electric current reaches the switch 8 from a power source A. The switch 8 may be set selectively in any one of three positions: Figure IV, to permit an electric current to pass through the circuit B which actuates the fan motor 7; Figure VI, to permit an electric current to pass through the circuit B and the circuit C which actuates the heating element 4; and Figure V, in open position to prevent the current from passing through either circuit B or circuit C.

Referring to Figure III, the switch 8 has a frame 10 which has a top flanged portion 11 bolted to the frame 5. A first connector 12 is connected to the power source A and is mounted at one end of the frame 10 and insulated therefrom. The connector 12 has two contact buttons 13 and 14 attached thereto. Movable contact buttons 15 and 16, which are mates respectively for the fixed buttons 13 and 14, are mounted respectively on switch leaves 17 and 18, which exert resilient force to maintain the movable buttons 15 and 16 in contact with the fixed buttons 13 and 14. The switch leaves 17 and 18 are mounted on the frame 10 opposite the first connector 12 and insulated from the frame 10. Second and third connectors 19 and 20 are connected respectively to the circuits B and C and are mounted on the fixed ends of the switch leaves 17 and 18, respectively. Thus the path of the current from A to B is through the first connector 12, the fixed button 13, the movable button 15, the switch leaf 17 and the second connector 19; and the path of the current from A to C is through the first connector 12, the fixed button 14, the movable button 16, the switch leaf 18 and the third connector 20.

A rotatable shaft 21 extending in vertical position generally parallel to the plane formed by the switch leaves 17 and 18 has turned down ends 22 which are rotatably mounted in the top flanged portion 11 of the frame 10 and in a bracket 23 extending forwardly from the bottom of the switch frame 10, thus preventing longitudinal movement of the shaft 21. The bracket 23 has an upwardly flanged portion 24 at its forward end, which fits into a slotted portion along the periphery of a collar 25 mounted at the bottom end of the shaft 21, thus limiting the angular movement of the shaft 21 to the length of the slotted portion in the collar 25. Cams 26 and 27 are mounted on the shaft 21 in front of the switch leaves 17 and 18, respectively. The cams 26 and 27 have raised portions 28 and 29 which contact raised portions 30 and 31 respectively in the switch leaves 17 and 18 to force the switch leaves 17 and 18 back and thus break the contacts between the movable buttons 15 and 16 and the fixed buttons 13 and 14. Also, the cams 26 and 27 have notches or depressed portions 32 and 33 in their periphery which do not contact the raised portions 30 and 31 of the switch leaves 17 and 18, thus permitting the switch leaves 17 and 18 to hold the movable buttons 15 and 16 in contact with the fixed buttons 13 and 14. The raised portions 28 and 29 on the cams 26 and 27 are so positioned that by selectively rotating the shaft 21 both raised portions may be held in contact with both of the switch leaves 17 and 18 (as shown in Figures III and V), or one raised portion 29 may be held in contact with only one switch leaf 18 (as shown in Figure IV), or the raised portions 28 and 29 may be in such a position that they do not contact either of the switch leaves 17 and 18 (as shown in Figure VI). The cams 26 and 27 are mounted on the shaft 21 so as to move with the rotation of the shaft 21, but the cams 26 and 27 may be reset on the shaft 21 so that their raised portions 28 and 29 are in different angular positions or the cams 26 and 27 may be replaced by other cams having raised portions differently positioned along the periphery of each of such cams. Also, a switch embodying the invention may include more than the two sets of cams and switch leaves shown herein. Thus, any number of circuits may be controlled by the use of a switch embodying the invention and the combinations in which it may be desired to use such circuits may be altered at will by the selective use of cams of different shapes and different positions of the cams on the shaft 21.

A collar 34 is mounted on the upper portion of the shaft 21 and there are a plurality of notches 35 cut in the periphery of the collar 34. A detent 36 mounted on the frame 10 and engaging the notches 35 in the collar 34 acts as a brake to hold the shaft 21 at any given position. A bifurcated actuating arm 37 is mounted on the upper end of the shaft 21 with its legs 38 and 39 extending forwardly in a plane perpendicular to the shaft 21. The switch handle 9 is mounted on a pivot 40 which, in turn, is riveted to the frame 5. One end of the switch handle 9 extends forwardly outside the housing 2, through the bottom of the grill 3, and has a manually graspable knob 41. The other end of the switch handle 9 has a downwardly turned finger 42 which is positioned between the legs 38 and 39 of the bifurcated actuating arm 37.

The setting of the switch is changed by swinging the handle 41 which moves the finger 42 at the other end of the switch handle 9. This moves the bifurcated actuating arm 37 and rotates the shaft 21. The force exerted by the detent 36 against the notched collar 34 acts as an "over-center" device to snap the bifurcated arm 37, the shaft 21 and the cams 26 and 27 into the new position after the shaft has been rotated beyond the mid-point between any pair of adjacent positions.

The particular advantages of the switch embodying the invention reside not only in the simplicity of construction and operation but also in the safety of the operation since it is possible to maintain the parts of the switch which might "flash" during operation in a remote and protected part of the electric heater.

The embodiment of the invention which has been disclosed may be modified to meet various requirements.

Having described the invention, I claim:

1. A multiple pole switch comprising, in combination, a rotatable shaft, a plurality of pairs of contacts, one of each pair of contacts being stationary and the other of each pair of contacts being mounted on a resilient member mounted to normally hold said pair of said contacts closed and to open in a direction transverse to the axis of said shaft, an actuating cam mounted on said shaft for each of said pairs of contacts, the edge of the cam having a notch corresponding to each desired closed position of the corresponding pair of contacts; a protuberance on the inner side of each of said resilient members adapted to drop into any one of the notches in the corresponding cam, and to ride against the edge of such cam between notches, each of said cams being angularly positionable on said shaft in any of a plurality of positions whereby the open or closed condition of any of said pairs of contacts may be selectively pre-set for any given position of said shaft, a peripherally notched member mounted to rotate with said shaft and a spring detent cooperating therewith for controlling step-by-step rotation of said shaft, a bifurcated arm fixed on said shaft and a pivotally mounted actuating lever, one end of said lever extending between the bifurcations of said arm and the other end of said lever extending away from said switch for manual operation thereof.

2. A combination heater and fan having a first circuit including an electrical heating element, a second circuit including an electric fan, and a switch mechanism therefor comprising, in combination, a pair of contacts for the circuit to the element, a second pair of contacts for the circuit to the fan, each of said pair of contacts having a stationary contact and a movable contact mounted on a resilient leaf, a cam shaft, a cam corresponding to each pair of contacts selectively positionable on said shaft in any one of a plurality of angular positions and each having a notch corresponding to a selected closed position of the associated one of said pairs of contacts, each of said leaves riding the surface of its corresponding cam, and manually actuatable means comprising a bifurcated arm fixed on said shaft and a pivotally mounted lever one end of which extends between said bifurcations for rotating said shaft and the cams thereon to any one of a plurality of pre-selected positions to selectively close and open said pairs of contacts and thereby selectively energize the element and the fan or both.

GUY H. ALLGEYER.

REFERENCES CITED

The following references are of record in the file of this patent:

UNITED STATES PATENTS

| Number | Name | Date |
|---|---|---|
| 1,924,351 | Doddridge | Aug. 29, 1933 |
| 2,030,890 | Oberhoffken | Feb. 18, 1936 |
| 2,137,872 | Bogaerte | Nov. 22, 1938 |
| 2,275,510 | Dietrich et al. | Mar. 10, 1942 |
| 2,319,503 | Glogau | May 18, 1943 |